United States Patent
Favero et al.

(10) Patent No.: US 12,534,614 B2
(45) Date of Patent: Jan. 27, 2026

(54) BINDER COMPOSITION FOR IRON ORE AGGLOMERATION

(71) Applicant: SNF Group, Andrezieux Boutheon (FR)

(72) Inventors: Cédrick Favero, Andrezieux Boutheon (FR); Gilles Zakosek, Andrezieux Boutheon (FR); Thomas Boursier, Andrezieux Boutheon (FR)

(73) Assignee: SNF GROUP, Andrezieux-Boutheon (FR)

( * ) Notice: Subject to any disclaimer, the term of this patent is extended or adjusted under 35 U.S.C. 154(b) by 0 days.

(21) Appl. No.: 18/868,082

(22) PCT Filed: May 16, 2023

(86) PCT No.: PCT/EP2023/063182
§ 371 (c)(1),
(2) Date: Nov. 21, 2024

(87) PCT Pub. No.: WO2023/227427
PCT Pub. Date: Nov. 30, 2023

(65) Prior Publication Data
US 2025/0163258 A1    May 22, 2025

(30) Foreign Application Priority Data

May 24, 2022 (FR) ........................ 2204967

(51) Int. Cl.
| | |
|---|---|
| *C08L 33/26* | (2006.01) |
| *C08K 3/26* | (2006.01) |
| *C08L 33/02* | (2006.01) |
| *C22B 1/24* | (2006.01) |

(52) U.S. Cl.
CPC .............. *C08L 33/26* (2013.01); *C08K 3/26* (2013.01); *C08L 33/02* (2013.01); *C22B 1/2406* (2013.01); *C08K 2003/262* (2013.01); *C08L 2205/025* (2013.01)

(58) Field of Classification Search
CPC ......... C22B 1/242; C22B 1/243; C22B 1/244; C22B 1/2406; C22B 1/14; C22B 1/248; C08L 33/02; C08L 33/26; C08K 3/26; C08K 2003/262

See application file for complete search history.

(56) References Cited

U.S. PATENT DOCUMENTS 5,002,607 A    3/1991    Flesher et al.

FOREIGN PATENT DOCUMENTS

| EP | 0225171 A2 | 6/1987 |
| EP | 288150 A1 | 10/1988 |
| WO | 2017/037207 A1 | 3/2017 |

OTHER PUBLICATIONS

Okubo, Tsuneo et al. Macromolecules vol. 21 pp. 2744-2747 (Year: 1988).*
Bonapasta, Aldo Amore. Chemsitry of Materials vol. 13 pp. 64-70 (Year: 2001).*
International Search Report and Written Opinion of the International Searching Authority for PCT/EP2023/063182, mailed on Sep. 1, 2023.
Halt et al., "Review of organic binders for iron ore concentrate agglomeration", Minerals and Metallurgical Processing,Society for Mining, Metallurgy and Exploration, US, vol. 31, No. 2, May 1, 2014 (May 1, 2014), pp. 73-94.
Eisele et al, "A Review of Binders in Iron Ore Pelletization", Mineral Processing and Extractive Metallurgy Review, Gordon and Breach, New York, NY, US, vol. 24, Jan. 1, 2003 (Jan. 1, 2003), pp. 1-90.

* cited by examiner

*Primary Examiner* — Jeffrey S Lenihan
(74) *Attorney, Agent, or Firm* — HESLIN ROTHENBERG FARLEY & MESITI P.C.

(57) ABSTRACT

This invention relates to a binder composition for the manufacture of iron ore pellets containing:
a) at least two organic binding agents LO in the form of solid particles, which are at least:
   a water-soluble anionic polymer P1 with a weight average molecular weight between 500 and 200,000 daltons, and,
   a water-soluble anionic polymer P2 with a weight average molecular weight greater than 500,000 daltons; and;
b) at least one inorganic binding agent LI in the form of solid particles, the solid particles of the binding agents LO having a number median size of more than 500 micrometers,
the particles of the binding agent LI have a number median size of less than one-third of the number median size of the solid particles of the binding agents LO.

16 Claims, No Drawings

BINDER COMPOSITION FOR IRON ORE AGGLOMERATION

CROSS REFERENCE TO RELATED APPLICATIONS

This application is a national stage filing under section 371 of International Application No. PCT/EP2023/063182 filed on May 16, 2023, and published on Nov. 30, 2023 as WO 2023/227427, which claims priority to French Application No. 2204967, filed on May 24, 2022. The entire contents of WO 2023/227427 are hereby incorporated herein by reference.

FIELD OF INVENTION

This invention relates to a binder composition for the manufacture of iron ore pellets. More specifically, the binder composition contains at least two organic binding agents and at least one inorganic binding agent. These binders are of a specific nature.

PRIOR ART

Iron ore should be in the form of large pellets when loaded into a blast furnace. If the ore is in the form of particles that are too small to be introduced directly into the blast furnace, they must be processed into pellets. It has become necessary to grind the ore more finely due to the increasing use of lower-quality ores. Pelletizing (or granulation) is the only satisfactory method of producing furnace feedstock from these fine particles.

Pellets are made by adding a binder to fine particle ore and agitating it in the presence of a small amount of water (usually the moisture from the ore) to form a wet mix, then shoveling the mix in a pelletizing drum or disc pelletizer, for example. The green pellets (or raw pellets, as they are called before they are sintered by firing) are then fired in a furnace over a range of temperatures from an inlet temperature typically between 200 and 400 degrees Celsius to a high final temperature, for example, 1,200 degrees Celsius.

Important pellet properties are initial or wet strength, dry strength (after drying the green pellets in a furnace at 105° C.), and the tendency of the pellets to crumble (or burst or flake) when they are exposed to furnace firing temperatures. The tendency to flake can be defined by determining the minimum temperature at which flaking occurs or by observing the percentage of fines formed during a particular firing cycle. The water content of the mix and the porosity of the pellets must be selected carefully. A high "drop number" for green pellets is desirable. For cost reasons, the amount of binder should be as low as possible and, to ensure uniform properties, its flow properties should be such that it may be uniformly and easily added in this small amount.

The binder is traditionally clay (usually bentonite), cement (usually Portland cement), or lime. However, various proposals have been made to use organic polymers as a binder. Thus, natural polymers have been considered, in particular cellulose polymers, but they are not entirely satisfactory. Indeed, it can be quite difficult to precisely regulate their addition to the particulate material. Synthetic polymers (generally water-soluble linear anionic polymers that have a molecular weight of 1 million to 20 million in powder form) have also been proposed for many years, but their use also presents difficulties.

For example, WO 2017/037207 discloses a binder composition comprising a water-soluble polymer with a molecular weight comprised between 1,000 and 20,000 Da, a copolymer with a molecular weight of more than 300,000 Da, and an inorganic pelletizing aid. In the same field, U.S. Pat. No. 5,002,607 describes a binder composition including a water-soluble polymer with a molecular weight of less than 50,000 Da, a bonding agent polymer with a molecular weight of more than 1 million Da and an inorganic pelletizing aid.

The sizes of the polymer particles are generally relatively large, typically greater than 700 μm. The results obtained with large particle-size products such as these are not entirely satisfactory. Indeed, the pellets obtained tend to be contaminated by the dust which is attached to their surface, and which is then blown out of the pellets during their subsequent metallurgical use. It is believed that this problem is due to the pellets having a surface that is stickier than desirable. Whatever the cause, the disadvantage of pellets is that when air is blown through a bed of pellets, metal ore dust is carried into the air and out of the furnace. This can create pollution problems and undesirable wear on fans and other parts of the furnace and related appliances.

In patents EP 0225171 and EP 288150, specific synthetic polymers are proposed, and the dry particle size of these polymers must be between 20 and 300 μm. This size is preferably less than 100 μm, in a proportion of at least 50% by weight.

Using smaller particles tends to give better granulation performance (including reduced dust problems) but causes some handling problems. The particles are generally ground gel particles. However, handling very small, crushed gel particles can itself pose problems. On the one hand, because of the risk that the polymer fines will be blown out in the mixing step, and on the other hand, because the flow properties of the particles are not entirely satisfactory, and finally because precise metering of the particles into the particulate material can be difficult.

PRESENTATION OF THE INVENTION

The applicant has unexpectedly discovered that a binder composition for the manufacture of iron ore pellets containing at least two organic binding agents and at least one inorganic binding agent, these binders being of a specific nature, makes it possible to maintain satisfactory granulation performance, minimize dust problems, facilitate handling properties, and allow the use of large polymer particles. Additionally, the pellets may have a more uniform shape within the scope of the invention than when using other polymer-based binders.

More specifically, the invention relates to a binder composition for the manufacture of iron ore pellets containing:
a) at least two organic binding agents LO in the form of solid particles, which are at least:
   a water-soluble polymer anionic polymer P1 with a weight-average molecular weight of between 500 and 200,000 daltons, and
   an anionic or amphoteric water-soluble polymer P2 with a weight-average molecular weight greater than 500,000 daltons; and
b) at least one inorganic binding agent LI in the form of solid particles,
   the solid particles of the binding agents LO have a number median size greater than 500 micrometers and, the particles of the binding agent LI have a number median size of less than one-third of the number median size of the solid particles of the binding agents LO.

This binding composition, therefore, comprises a mixture of anionic water-soluble polymer P1, anionic or amphoteric water-soluble polymer P2, and an inorganic binding agent LI.

Another aspect of the invention relates to iron ore pellets containing between 50 and 5000 ppm of the binder composition of the invention.

The term "polymer" denotes both homopolymers and copolymers of at least two different monomers.

As used herein, the term "water-soluble polymer" is to be understood as a polymer that yields an aqueous solution without insoluble particles when dissolved with stirring for 4 hours at 25° C. and with a concentration of 20 $gL^{-1}$ in deionized water.

The value ranges include the lower and upper limits. Thus, the ranges of values "between 0.1 and 1.0" and "from 0.1 to 1" include the values 0.1 and 1.0.

According to this invention, the weight-average molecular weight of the water-soluble polymers P1 and P2 is determined by measuring the intrinsic viscosity. Intrinsic viscosity may be measured by methods known to those skilled in the art and may, in particular, be calculated from the values of reduced viscosity for different concentrations by a graphical method consisting in plotting the values of reduced viscosity (on the ordinate axis) as a function of the concentrations (on the abscissa axis) and by extrapolating the curve to a zero concentration. The intrinsic viscosity value is read on the ordinate axis or using the least-squares method. Then the weight-average molecular weight may be determined by the Mark-Houwink equation:

$$[\eta]=KM^\alpha$$

[η] represents the intrinsic viscosity of the polymer determined by the solution viscosity measurement method,
K represents an empirical constant,
M represents the molecular weight of the polymer,
α represents the Mark-Houwink coefficient,
α and K depend on the particular polymer-solvent system. Tables known to those skilled in the art give the values of a and K according to the polymer-solvent system.

The water-soluble polymer P1 has a weight-average molecular weight of between 500 and 200,000 daltons, more preferably between 1,000 and 50,000 daltons, and even more preferably between 1,000 and 10,000 daltons.

The water-soluble polymer P2 has a weight-average molecular weight greater than 500,000 daltons, more preferably greater than 1 million daltons. The water-soluble polymer P2 usually has a weight-average molecular weight of fewer than 40 million daltons, preferably less than 30 million daltons.

The water-soluble polymer P1 is anionic. It, therefore, contains anionic monomers and optionally nonionic monomers.

Advantageously, polymer P1 contains between 50 and 100 mol %, more preferably between 70 and 100 mol %, and even more preferably between 90 and 100 mol %, of anionic monomers.

The nonionic monomers of the water-soluble polymer P1 are preferably selected from the group containing acrylamide, methacrylamide, N-alkylacrylamides, N-alkylmethacrylamides, N,N-dialkylacrylamides, N,N-dialkylmethacrylamides, alkoxylated esters acrylic acid, alkoxylated esters of methacrylic acid, N-vinylpyridine, N-vinylpyrrolidone, hydroxyalkylacrylates, hydroxyalkyl methacrylates, and mixtures thereof. Among these nonionic monomers, the alkyl groups are advantageously $C_1$-$C_5$ and more advantageously $C_1$-$C_3$. They are preferably linear alkyls.

The anionic monomers of the water-soluble polymer P1 are preferably selected from the group comprising monomers having a carboxylic acid function and salts thereof, including acrylic acid, methacrylic acid, itaconic acid, maleic acid; monomers having a sulfonic acid function, and salts thereof, including acrylamido-tert-butyl sulfonic acid (ATBS), allyl sulfonic acid, methallyl sulfonic acid, and salts thereof; and monomers having a phosphonic acid function and salts thereof.

The salts may be alkali metal or alkaline earth metal salts. The term "alkaline" should be understood as an alkali metal, advantageously lithium, sodium, or potassium. The term "alkaline-earth" should be understood as an alkaline-earth metal, advantageously calcium or magnesium.

Preferably, polymer P1 is a polymer of at least one anionic monomer containing at least one carboxylate function —C(=O)—O$^-$X$^+$ where X is an alkali metal and at least one carboxylate function —C(=O)—O$^-$X'$^+$ where X' is an alkaline earth metal.

Thus, this does not exclude the presence of anionic monomers in polymer P1 that contain carboxylic acid functions (not neutralized). In other words, the simultaneous presence of anionic monomers with carboxylic acid functions and the same monomers with carboxylate functions is possible.

Advantageously, when an anionic monomer of polymer P1 is present both in its carboxylic acid form and its carboxylate form, the proportion in carboxylate form is between 10 and 100 mol %, more advantageously between 20 and 100 mol %, with respect to the carboxylate and carboxylic acid forms.

Advantageously, between 40 and 60 mol % of the carboxylate functions of polymer P1 are neutralized by alkaline salts, and between 40 and 60 mol % of the carboxylate functions are neutralized by alkaline-earth salts.

Even more preferentially, at least one of the anionic monomers of polymer P1 containing carboxylate functions is an acrylic acid salt.

Polymer P1 is advantageously a polymer of at least one mixture of alkali metal salts (advantageously sodium) and of alkaline earth metal salts (advantageously calcium) of acrylic acid $CH_2$=CH—C(=O)OH.

According to a preferred embodiment, the carboxylate functions of polymer P1 are neutralized with sodium and calcium.

Advantageously, polymer P1 contains at least sodium acrylate and calcium acrylate.

Polymer P1 may be linear or structured by at least one structural agent, which may advantageously be selected from the group comprising polyethylenically unsaturated monomers (having at least two unsaturated functions), such as, for example, vinyl, allylic, acrylic, and epoxy functions, and mention may be made, for example, of sodium allyl sulfonate, sodium methallyl sulfonate, sodium methallyl disulfonate, methylenebisacrylamide, diallylamine, triallylamine, trialkylammonium chloride, tetraalkylammonium chloride or by macroinitiators such as polyperoxides, polyazoics and polytransfer agents such as polymercaptan polymers or hydroxyalkylacrylates and epoxy vinyl.

Polymer P1 may also be structured using controlled radical polymerization techniques (CRP, an acronym for "Controlled Radical Polymerization") or, more particularly, of the RAFT type (an acronym for "Reversible Addition Fragmentation Chain Transfer").

The solid polymer particles P1 are in the form of powders. These particulate forms are obtained by techniques known to those skilled in the art.

The powder form of polymer P1 may be obtained by polymerization in an aqueous solution followed by drum drying, spray drying, radiation drying, such as microwave drying, or fluidized bed drying.

Preferably, polymer P1 is in the form of a powder resulting from polymerization in an aqueous solution followed by drum drying.

The polymerization to obtain polymer P1 of the invention is generally carried out by the radical route. This includes free radical polymerization using UV, azo, redox, or thermal initiators as well as CRP or, more particularly, RAFT type polymerization techniques.

Several additives (azo compounds, oxidizing/reducing couple, transfer agents, terminating agents, etc.) known to those skilled in the art may advantageously be added during the polymerization of polymer P1. Several of them may contain sulfur, such as sodium bisulfite, sodium metabisulfite, or sodium persulfate.

The initiation of the polymerization of polymer P1 may be carried out in the presence of oxidizing/reducing couples. One of the preferred sulfur-containing oxidants is sodium persulfate.

Preferably, polymer P1 contains at most 2% by weight of sulfur, more preferably at most 1% by weight of sulfur, said sulfur being derived from sodium bisulfite, and/or sodium metabisulfite, and/or sodium persulfate.

"A and/or B" means either A, or B, or A and B.

The water-soluble polymer P2 is anionic or amphoteric. It, therefore, contains anionic monomers, optionally cationic monomers, and optionally nonionic monomers.

The nonionic monomers of the water-soluble polymer P2 are preferably selected from the group containing acrylamide, methacrylamide, N-alkylacrylamides, N-alkylmethacrylamides, N,N-dialkylacrylamides, N,N-dialkylmethacrylamides, alkoxylated esters acrylic acid, alkoxylated esters of methacrylic acid, N-vinylpyridine, N-vinylpyrrolidone, hydroxyalkylacrylates, hydroxyalkyl methacrylates, and mixtures thereof. Among these nonionic monomers, the alkyl groups are advantageously $C_1$-$C_5$ and more advantageously $C_1$-$C_3$. They are preferably linear alkyls. The nonionic monomer is preferably acrylamide.

The anionic monomers of the water-soluble polymer P2 are preferably selected from the group comprising monomers having a carboxylic acid function and salts thereof, including acrylic acid, methacrylic acid, itaconic acid, maleic acid; monomers having a sulfonic acid function, and salts thereof, including acrylamido-tert-butyl sulfonic acid (ATBS), allyl sulfonic acid, methallyl sulfonic acid, and salts thereof; and monomers having a phosphonic acid function and salts thereof. The preferred anionic monomer is acrylic acid and salts thereof.

The salts may be alkali metal or alkaline earth metal salts. Advantageously, the alkali metal is sodium.

The cationic monomers of the water-soluble polymer P2 are preferably selected from the group consisting of quaternized or salified dimethylaminoethyl acrylate (ADAME), quaternized or salified dimethylaminoethyl methacrylate (MADAME), diallyl dimethyl ammonium chloride (DADMAC), acrylamido propyl trimethyl ammonium chloride (APTAC), and methacryl aminopropyl trimethyl ammonium chloride (MAPTAC).

Advantageously, the cationic monomers of polymer P2 have a halide as a counterion, preferably a chloride ion. The preferred cationic monomer is dimethylaminoethyl acrylate (ADAME), quaternized with methyl chloride.

Preferably, polymer P2 is a copolymer of acrylamide and sodium acrylate.

Polymer P2 may be linear or structured by at least one structural agent, which may advantageously be selected from the group comprising polyethylenically unsaturated monomers (having at least two unsaturated functions), such as, for example, vinyl, allylic, acrylic, and epoxy functions, and mention may be made, for example, of sodium allyl sulfonate, sodium methallyl sulfonate, sodium methallyl disulfonate, methylenebisacrylamide, diallylamine, triallylamine, trialkylammonium chloride, tetraalkylammonium chloride or by macroinitiators such as polyperoxides, polyazoics and polytransfer agents such as polymercaptan polymers or hydroxyalkylacrylates and epoxy vinyl.

Polymer P2 may also be structured using the CRP polymerization techniques or, more particularly, of the RAFT type.

Advantageously, polymer P2 is structured in the form of a star, having a central part (the core) and polymer-based arms extending radially from said central part.

The water-soluble polymer P2 is advantageously a copolymer of at least one nonionic monomer (advantageously acrylamide) and at least one anionic monomer (advantageously acrylic acid and/or salts thereof).

The polymeric micro-gel advantageously comprises between 0 and 100 mol % of cationic monomers, preferably between 0 and 80 mol %, more preferably between 0 and 60 mol %, and even more preferably between 0 and 50 mol %. In particular, polymer P2 preferably contains between 5 and less than 100 mol % (100% excluded), more preferably between 10 and 80 mol % and even more preferably between 20 and 60 mol % of sodium acrylate; and between more than 0 and 95 mol % (0% excluded), more preferentially between 20 and 90 mol % and even more preferentially between 40 and 80 mol % of acrylamide.

The solid particles of polymer P2 are in the form of powders or microbeads. These particulate forms are obtained by techniques known to those skilled in the art.

The powder form of polymer P2 may be obtained by gel polymerization, aqueous solution polymerization followed by drum drying, spray drying, or radiation drying such as microwave drying or fluidized bed drying.

The powder form of the water-soluble polymer P2 may also be obtained by water-in-oil emulsion polymerization (inverse emulsion), followed by a distillation/concentration step and spray-drying of the resulting liquid.

The P2 polymer microbeads are advantageously obtained by reverse suspension polymerization.

Preferably, polymer P2 is in the form of a powder resulting from gel polymerization or of microbeads resulting from reverse suspension polymerization.

The polymerization to obtain polymer P2 of the invention is carried out by the radical route. It includes free radical polymerization using UV, azo, redox, or thermal initiators as well as CRP or, more particularly, type polymerization techniques.

The binding composition of the invention also comprises an inorganic binding agent LI. This LI binding agent is advantageously non-polymeric. It is preferably selected from sodium carbonate, sodium bicarbonate, sodium phosphate, sodium silicate, urea, calcium oxide, bentonite, and mixtures thereof.

Preferably, the binder composition consists of P1+P2+LI, and contains:

between 2 and 40% by weight of polymer P1,
between 20 and 60% by weight of polymer P2, and
between 30 and 70% by weight of binding agent LI,
the sum of the percentages by weight of P1+P2+LI being equal to 100%.

More preferably, the binder composition contains:
between 5 and 30% by weight of polymer P1,
between 25 and 55% by weight of polymer P2, and
between 35 and 65% by weight of the binding agent LI,
the sum of the percentages by weight of P1+P2+LI being equal to 100%.

Even more preferably, the binder composition contains:
between 8 and 25% by weight of polymer P1,
between 35 and 50% by weight of polymer P2, and
between 40 and 60% by weight of binding agent LI,
the sum of the percentages by weight of P1+P2+LI being equal to 100%.

According to the invention, the binding agents LO (P1 and P2) and the binding agent LI are in the form of solid particles, such that the median size in the number of the solid particles ($D_{50}$) of the binding agents LO is greater than 500 micrometers and the median size by the number of the particles of the binding agent LI is less than one-third of the median size by the number of the solid particles of the binding agents LO.

The median size ($D_{50}$) in the number of particles is defined as the largest dimension (the diameter in the case of spherical particles) of the particles for which half of the population (half of the particles) is below this value.

In the case of spherical particles, particle size refers to the average diameter measured using a laser diffraction particle analyzer according to the traditional techniques of one skilled in the art. One example of a device for measuring particle size is the Mastersizer from Malvern Instruments.

Advantageously, the median size in the number of the organic binders LO is between 500 and 5000 micrometers, more preferably between 500 and 2000 micrometers.

The binder composition, according to the invention, is generally formed by simple mixing of its constituents, each being in powder form.

Finally, a last aspect of the invention relates to iron ore pellets containing between 50 and 5000 ppm of the binder composition, by weight, relative to the weight of the iron ore pellets.

Pellets are typically prepared by adding the binder composition to the fine particle ore and agitating it in the presence of a small amount of water (preferably the moisture in the ore) to form a wet mixture, and then pelleting (granulating) the mixture, for example in a pelletizing drum or disc pelletizer.

The following examples illustrate the invention without limiting its scope.

EXAMPLES

Synthesis of a P1 Polymer

A P1 polymer is obtained by a process for polymerization of acrylic acid in an aqueous solution, as is known to those skilled in the art. The monomers are introduced by casting in a heated reactor, in parallel with the introduction of an initiator and transfer agent solution. The initiator solution is composed of ammonium persulfate combined with sodium bisulfite as a reducing agent. The proportion of sulfur in all the components involved in the process is strictly less than 2% by weight of the total formulation. Polymer P1 is neutralized with soda so as to obtain sodium counterions or with soda and calcium oxide so as to obtain sodium and calcium counterions, of different nature, in proportions 50/50 by weight. This neutralization is carried out on the polymer before the end of the polymerization. At the end of the polymerization, the polymer solution is drum-dried to obtain the P1 polymer in powder form.

Four tests leading to the synthesis of four P1 polymers, that is, P1-A (according to the invention), P1-B (according to the invention), P1-C (comparative) and P1-D (comparative) were thus performed.

Synthesis of the P2 Polymer

Polymer P2 is obtained by gel polymerization of acrylamide and sodium acrylate, as is known to those skilled in the art. At the end of polymerization, the polymer gel is granulated, dried, ground, and sieved to obtain polymer P2 in powder form.

Four tests leading to the synthesis of four P2 polymers, that is, P2-A (according to the invention), P2-B (according to the invention), P2-C (comparative) and P2-D (comparative) were thus performed.

Manufacture of the Pellets

In the following examples, green iron ore pellets comprising various compounds in the amounts shown in Table 1 were prepared. The green pellets were prepared by agglomerating iron ore concentrate in the presence of a binder composition. The binder amounts (in weight percent) shown in Table 1 are based on the total weight of the iron ore concentrate. The iron ore concentrate used in the examples of Table 1 is a Brazilian hematite ore concentrate.

The inorganic binder LI used is sodium carbonate, obtained from two different sources: LI-1 (according to the invention) and LI-2 (comparative).

As explained in Table 2, various comparative binder compositions (CEX 1 to CEX 12) and (C1 to C5) according to the invention were produced. They all consist of inorganic binder LI and two organic binders, which are polymers P1 and P2 synthesized previously. In each case, the binding composition is made by compounding, using a mixture that makes homogenization of the three components possible.

The manufacturing process for green ore pellets is generally known to those skilled in the art. Different green ore pellets were produced to test the different binder compositions.

First, the binder composition is mixed into the dry ore concentrate and homogenized with the required amount of water (moisture content between 8 and 9% by weight). The ore concentrate is mixed with the binder composition using a mixer of the Kitchen Aid type.

Next, pellet precursors (or seeds) are formed by placing a small portion of the previously obtained mixture of ore concentrate and binder composition into a rotating tire (about 40 cm in diameter) and adding atomized water to initiate pellet growth. Pellet seeds of a size between 2.5 and 4 mm are thus formed.

Finished green pellets, ranging in size from 9.5 to 12.5 mm, are then obtained by placing 55 grams of pellet seeds in the rotating tire and adding part of the mixture (mineral concentrate+binding composition) remaining on a growth period of 5 to 6 minutes. Atomized water is added if necessary.

The moisture content, the number of drops, and the wet and dry compressive strengths of the green pellets obtained were measured for each case, the results being collated in Table 3.

Number of Wet Drops (NWD)

The number of wet drops was determined by repeatedly dropping a wet green pellet of a size between 11.2 and 12.5 mm from a height of 46 cm onto a horizontally placed steel plate until it dropped. A visible crack forms on the surface of the pellet. The number of times required for the pellet to reach its fracturing/cracking point was determined. This measurement is determined for 20 pellets. The average of these 20 measurements is called the number of wet drops (NWD).

Wet Compressive Strength (WCS)

20 wet green pellets with a size between 11.2 and 12.5 mm were stored in an airtight container. One by one, the pellets were removed and placed in a standard ANDILOG brand measuring device. The maximum applied force at which the pellet cracked was determined. The average of these 20 measurements is called "Wet Compressive Strength" (WCS).

Dry Compressive Strength (DCS)

20 green pellets of a size between 11.2 and 12.5 mm were dried in a furnace at 105° C. for at least two hours. After drying, the dried pellets were placed one by one in a standard ANDILOG brand measuring device. The maximum applied force at which the pellet cracked was determined. The average of these 20 measurements is called "Dry Compressive Strength" (DCS).

TABLE 1

Organic and Inorganic Binders.

| Polymer | Molecular weight (Daltons) | Anionicity (% mol) | Counterions of acrylic acid | $D_{50}$ (μm) |
|---|---|---|---|---|
| P1-A | 3,000 | 100 | $Na^+/Ca^{2+}$ | 525 |
| P1-B | 3,000 | 100 | $Na^+$ | 525 |
| P1-C | 250,000 | 100 | $Na^+/Ca^{2+}$ | 525 |
| P1-D | 3,000 | 100 | $Na^+$ | 350 |
| P2-A | 2,000,000 | 20 | / | 720 |
| P2-B | 6,000,000 | 30 | / | 720 |
| P2-C | 450,000 | 30 | / | 720 |
| P2-D | 6,000,000 | 30 | / | 420 |
| LI-1 | Light $Na_2CO_3$ | / | / | 68 |
| LI-2 | Dense $Na_2CO_3$ | / | / | 450 |

TABLE 2

Quantities of Binders and Minerals for Obtaining Green Pellets.

| Test | Ore concentrate (g) | Water (g) | P1-A | P1-B | P1-C | P1-D | P2-A | P2-B | P2-C | P2-D | LI-1 | LI-2 | Bentonite |
|---|---|---|---|---|---|---|---|---|---|---|---|---|---|
| C1 | 1829 | 170 | 0.2 | — | — | — | 0.4 | — | — | — | 0.4 | — | — |
| C2 | 1829 | 170 | 0.1 | — | — | — | 0.5 | — | — | — | 0.4 | — | — |
| C3 | 1829 | 170 | 0.2 | — | — | — | — | 0.4 | — | — | 0.4 | — | — |
| C4 | 1829 | 170 | 0.1 | — | — | — | — | 0.5 | — | — | 0.4 | — | — |
| C5 | 1829 | 170 | — | 0.2 | — | — | 0.4 | — | — | — | 0.4 | — | — |
| CEX 1 | 1810 | 170 | — | — | — | — | — | — | — | — | — | — | 20 |
| CEX 2 | 1829 | 170 | — | — | 0.2 | — | 0.4 | — | — | — | 0.4 | — | — |
| CEX 3 | 1829 | 170 | — | — | 0.2 | — | — | 0.4 | — | — | 0.4 | — | — |
| CEX 4 | 1829 | 170 | 0.2 | — | — | — | — | — | 0.4 | — | 0.4 | — | — |
| CEX 5 | 1829 | 170 | 0.2 | — | — | — | 0.4 | — | — | — | — | 0.4 | — |
| CEX 6 | 1829 | 170 | 0.7 | — | — | — | 0.1 | — | — | — | 0.2 | — | — |
| CEX 7 | 1829.4 | 170 | 0.6 | — | — | — | — | — | — | — | — | — | — |
| CEX 8 | 1829.4 | 170 | — | — | — | — | 0.6 | — | — | — | — | — | — |
| CEX 9 | 1829.4 | 170 | — | — | — | — | — | 0.6 | — | — | — | — | — |
| CEX 10 | 1829.6 | 170 | — | — | — | — | — | — | — | — | 0.4 | — | — |
| CEX 11 | 1829 | 170 | — | — | — | 0.2 | — | 0.4 | — | — | 0.4 | — | — |
| CEX 12 | 1829 | 170 | 0.2 | — | — | — | — | — | — | 0.4 | 0.4 | — | — |

TABLE 3

Physical Properties of Green Pellets.

| Test | Surface appearance of the pellets | NWD | WCS (kg) | DCS (kg) |
|---|---|---|---|---|
| C1 | Smooth and shiny | 4.5 | 1:35 | 6.3 |
| C2 | Smooth and shiny | 4.9 | 1.3 | 4.9 |
| C3 | Smooth and shiny | 6.5 | 1.3 | 5.1 |
| C4 | Smooth and shiny | 6 | 1.3 | 4.2 |
| C5 | Smooth and shiny | 6 | 1.3 | 4.7 |
| CEX 1 | Slightly grainy - Matte | 2.9 | 1.4 | 6.2 |
| CEX 2 | Very grainy (orange peel) | 4.2 | 1 | 2.9 |
| CEX 3 | Very grainy (orange peel) | 4 | 1.2 | 2.7 |
| CEX 4 | Smooth but very wet - sticky | 3.5 | 1 | 1.8 |
| CEX 5 | Very grainy (orange peel) + holes | 3.8 | 1 | 1.7 |
| CEX 6 | Smooth too wet - too sticky | 3.1 | 0.85 | 1.65 |
| CEX 7 | Smooth but very wet - sticky | 3.2 | 0.9 | 1.85 |
| CEX 8 | Very grainy (orange peel) + holes | 4 | 1 | 1.95 |
| CEX 9 | Very grainy (orange peel) + holes | 4.2 | 1 | 2 |
| CEX 10 | Very grainy (orange peel) + holes | 1 | 0.3 | 0.85 |
| CEX 11 | Slightly grainy (orange peel) - Matte | 3.2 | 1.3 | 3.0 |
| CEX 12 | Very grainy (orange peel) | 3.5 | 1 | 2.5 |

Table 3 shows that the green pellets from Examples C1 to C5, which use the binder compositions according to the invention, have a smoother surface than the green pellets from the comparative test CEX 1 to CEX 12.

Improving the surface condition of pellets is very important for the industrialist because grainy and/or non-smooth surfaces cause an increase in the abrasion and tumbling indices, which leads to a decrease in the market size of pellets and an increase in the dust content in the furnace and during handling.

The dry compressive strength for the tests for the composition binder according to the invention C1 to C5 is improved compared to the tests of the comparative binder compositions CEX 1 to CEX 12. This parameter is very important for the industrialist because it makes it possible to determine the behavior of the pellets in the furnace: a higher dry compressive strength will avoid broken pellets in the bed and will produce pellets of a greater hardness.

Comparatively, the composition C3 makes it possible to improve the NWD and the DCS compared to binding composition C5. The choice of the counterions of polymer P1, therefore, has an influence on the physical properties of the pellets.

With regard to the tests of the comparative binder compositions CEX 2, CEX 3, and CEX 4, it is observed that the choice of the molecular weights of polymers P1 and P2 is important in order to have smooth pellet surfaces and good physical properties.

The comparative binder composition CEX 5 test demonstrates that the ratio between the size of the organic binders and the size of the inorganic binder is essential. If this ratio is outside the claimed range, then the surface of the pellets obtained is too fragile and therefore friable.

The comparative binder composition CEX 6 test demonstrates that the quantity of each binder in the green pellet is also an important criterion. If these quantities are outside the claimed range, the pellets are very sticky (which leads to a drop in productivity), and they are not strong enough for the industrialist.

The comparative binder compositions CEX 7, CEX 8, and CEX 9 tests demonstrate that the presence of at least two organic binding agents, namely polymer P1 and polymer P2, is essential.

Without one of these two polymers, the surface of the pellets is not smooth and does not have satisfactory physical properties.

The comparative binder composition CEX 10 test demonstrates the extreme importance of the presence of an organic binder LO. Without organic binder (only the presence of an inorganic binder LI). The surface of the pellets is not smooth and does not have satisfactory mechanical properties.

Finally, the comparative binder compositions CEX 11 and CEX 12 demonstrate that when polymer P1 or polymer P2 has a median size $D_{50}$ lower than 500 µm, the surface of the pellets is not smooth et does not have satisfactory mechanical properties.

The invention claimed is:

1. A binder composition for the manufacture of iron ore pellets, said binder composition containing:
   a) at least two organic binding agents LO in the form of solid particles, which are at least:
      a water-soluble anionic polymer P1 with a weight average molecular weight between 500 and 200,000 daltons, and
      a water-soluble anionic or amphoteric polymer P2 with a weight average molecular weight greater than 500,000 daltons; and
   b) at least one inorganic binding agent LI in the form of solid particles, the solid particles of the binders LO having a number median size greater than 500 micrometers, the particles of the binding agent LI have a number median size of less than one-third of the number median size of the solid particles of the binding agents LO,
      wherein polymer P1 is a polymer:
         of at least one anionic monomer containing (1) at least one carboxylate function —C(=O)—O⁻X⁺ where X is an alkali metal; and
         of at least one anionic monomer containing (2) at least one carboxylate function —C(=O)—O⁻ X⁺ where X' is an alkaline earth metal, and
      wherein said binder composition consists of P1+P2+LI, and contains:
         between 2 and 40% by weight of polymer P1,
         between 20 and 60% by weight of polymer P2, and
         between 30 and 70% by weight of binding agent LI,
         the sum of the percentages by weight of P1+P2+LI being equal to 100%.

2. The binder composition according to claim 1, characterized in that polymer P1 is a polymer of at least a mixture of alkali metal and alkaline-earth metal salts of acrylic acid $CH_2$=CH—C(=O) OH.

3. The binder composition according to claim 1, characterized in that the alkali metal is sodium and the alkaline-earth metal is calcium.

4. The binder composition according to claim 1, characterized in that polymer P1 contains a maximum of 2% by weight of sulfur, said sulfur being derived from sodium bisulfite and/or sodium metabisulfite and/or sodium persulfate.

5. The binder composition according to claim 1, characterized in that polymer P2 is a copolymer of acrylamide and sodium acrylate.

6. The binder composition according to claim 1, characterized in that polymer P2 is a copolymer containing between 5 and less than 100% by mole of sodium acrylate and between more than 0 and 95% by mole of acrylamide.

7. The binder composition according to claim 1, characterized in that the inorganic binding agent LI is selected from sodium carbonate, sodium bicarbonate, sodium phosphate, sodium silicate, calcium oxide, bentonite, and mixtures thereof.

8. An iron ore pellet containing between 50 and 5000 ppm by weight relative to the weight of the iron ore pellets, of a binder composition according to claim 1.

9. The binder composition according to one of claim 2, characterized in that the alkali metal is sodium and the alkaline-earth metal is calcium.

10. The binder composition according to claim 2, characterized in that polymer P1 contains a maximum of 2% by weight of sulfur, said sulfur being derived from sodium bisulfite and/or sodium metabisulfite and/or sodium persulfate.

11. The binder composition according to claim 9, characterized in that polymer P1 contains a maximum of 2% by weight of sulfur, said sulfur being derived from sodium bisulfite and/or sodium metabisulfite and/or sodium persulfate.

12. The binder composition according to claim 10, characterized in that polymer P2 is a copolymer of acrylamide and sodium acrylate.

13. The binder composition according to claim 10, characterized in that polymer P2 is a copolymer containing between 5 and less than 100% by mole of sodium acrylate and between more than 0 and 95% by mole of acrylamide.

14. The binder composition according to claim 11, characterized in that polymer P2 is a copolymer containing between 5 and less than 100% by mole of sodium acrylate and between more than 0 and 95% by mole of acrylamide.

15. The binder composition according to claim 14, characterized in that the inorganic binding agent LI is selected from sodium carbonate, sodium bicarbonate, sodium phosphate, sodium silicate, calcium oxide, bentonite, and mixtures thereof.

16. An iron ore pellet containing between 50 and 5000 ppm by weight relative to the weight of the iron ore pellets, of a binder composition according to claim 15.

* * * * *